(12) United States Patent
Hwang et al.

(10) Patent No.: US 12,507,101 B2
(45) Date of Patent: Dec. 23, 2025

(54) METHOD AND DEVICE FOR TRANSMITTING AND RECEIVING SIGNALS IN WIRELESS COMMUNICATION SYSTEM

(71) Applicant: Samsung Electronics Co., Ltd., Suwon-si (KR)

(72) Inventors: June Hwang, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 17/919,879

(22) PCT Filed: Apr. 23, 2021

(86) PCT No.: PCT/KR2021/005189
§ 371 (c)(1),
(2) Date: Oct. 19, 2022

(87) PCT Pub. No.: WO2021/215884
PCT Pub. Date: Oct. 28, 2021

(65) Prior Publication Data
US 2023/0164601 A1 May 25, 2023

(30) Foreign Application Priority Data
Apr. 24, 2020 (KR) .................. 10-2020-0050318

(51) Int. Cl.
*H04W 24/10* (2009.01)
*H04W 24/08* (2009.01)
(52) U.S. Cl.
CPC ........... *H04W 24/10* (2013.01); *H04W 24/08* (2013.01)
(58) Field of Classification Search
CPC ................................................ H04W 24/10
See application file for complete search history.

(56) References Cited

U.S. PATENT DOCUMENTS

2019/0306734 A1   10/2019   Huang et al.
2019/0313271 A1   10/2019   Yiu
(Continued)

FOREIGN PATENT DOCUMENTS

KR   10-2019-0101332 A   8/2019
KR   10-2020-0033744 A   3/2020

OTHER PUBLICATIONS

3GPP TS 38.331 V15.9.0, cation Group Radio Access Network; NR; Radio Resource Control (RRC) protocol specification, (Release 15), Mar. 31, 2020.
(Continued)

*Primary Examiner* — Jason E Mattis
(74) *Attorney, Agent, or Firm* — Jefferson IP Law, LLP

(57) ABSTRACT

The present disclosure relates to a method and apparatus for transmitting and receiving signals in a wireless communication system. According to an embodiment of the present disclosure, a terminal may receive measurement configuration information from a serving cell, identify whether a measurement object (MO) configured in the terminal is an MO corresponding to a synchronization signal block (SSB) to be measured, based on the measurement configuration information, receive at least one SSB measurement time configuration (SMTC) information among SMTC1 information and SMTC3 information, based on a measurement frequency identified through the measurement configuration information and an SSB index configured through subcarrier spacing, when the MO corresponding to the SSB to be measured is configured in the terminal, and perform SSB measurement based on the received SMTC information.

16 Claims, 13 Drawing Sheets

(56) References Cited

U.S. PATENT DOCUMENTS

| | | | |
|---|---|---|---|
| 2019/0319748 A1 | 10/2019 | Nam et al. | |
| 2020/0374735 A1 | 11/2020 | Wei et al. | |
| 2021/0204235 A1* | 7/2021 | Akl | H04W 56/0025 |
| 2021/0208602 A1 | 7/2021 | Yi et al. | |
| 2021/0329507 A1* | 10/2021 | Yao | H04W 36/0085 |
| 2021/0345321 A1* | 11/2021 | Wu | H04W 72/0446 |
| 2021/0377883 A1 | 12/2021 | Jung et al. | |
| 2022/0061010 A1* | 2/2022 | Harada | H04W 48/16 |
| 2023/0115685 A1* | 4/2023 | Hwang | H04W 8/26 |
| | | | 709/245 |

OTHER PUBLICATIONS

Extended European Search Report dated Jun. 13, 2023, issued in European Patent Application No. 21792820.9.
Samsung, 'SMTC occasion calculation for smtc3 for IAB-MT', R2-2003728, 3GPP TSG-RAN WG2 Meeting #109bis-e, Apr. 10, 2020.
International Search Report dated Jul. 23, 2021, issued in PCT Patent Application No. PCT/KR2021/005189.
European Notice of Allowance dated Jun. 5, 2025, issued in European Patent Application No. 21792820.9.

* cited by examiner

METHOD AND DEVICE FOR TRANSMITTING AND RECEIVING SIGNALS IN WIRELESS COMMUNICATION SYSTEM

TECHNICAL FIELD

The present disclosure relates to a method and apparatus for transmitting and receiving signals in a wireless communication system, and more particularly, to a method and apparatus for providing configuration information for a synchronization signal measurement time in an integrated access and backhaul (IAB) system.

BACKGROUND ART

Looking back on the progress of wireless communication generations, technologies have been developed mainly for human-oriented services such as voice, multimedia, and data. Connected devices being on a rapidly increasing trend after the commercialization of 5th generation (5G) communication systems are being predicted to be connected to communication networks. Examples of the things connected to networks may include vehicles, robots, drones, home appliances, displays, smart sensors installed in various infrastructures, construction machines, and factory apparatuses. Mobile devices are expected to evolve into various form factors such as augmented reality glasses, virtual reality headsets, and hologram devices. In the 6th generation (6G) era, efforts are being made to develop improved 6G communication systems to provide various services by connecting hundreds of billions of devices and things. For this reason, 6G communication systems are being called systems beyond 5G communication (beyond 5G).

In the 6G communication systems predicted to be realized around 2030, the maximum transmission rate is tera (i.e., 1,000 giga) bps and the radio latency is 100 microseconds (μsec). That is, compared to the 5G communication systems, in the 6G communication systems, the transmission rate increases by 50 times and the radio latency decreases to $\frac{1}{10}$ (one tenth).

In order to achieve such high data rates and ultra low latency, the 6G communication systems are considering implementation in the terahertz band (e.g., the 95 gigahertz (95 GHz) to 3 terahertz (3 THz) band). Compared to the millimeter wave (mmWave) bands introduced in the 5G communication systems, in the terahertz bands, the importance of technologies capable of ensuring the signal reach, that is, the coverage, is expected to increase due to more severe path loss and atmospheric absorption. Multiple antenna transmission technologies such as new waveforms, beamforming and massive multiple-input and multiple-output (massive MIMO), full dimensional MIMO (FD-MIMO), array antennas, and large scale antennas, which are superior to radio frequency (RF) devices, antennas, and orthogonal frequency division multiplexing (OFDM) in terms of the coverage, should be developed as main technologies for ensuring the coverage. In addition, new technologies such as metamaterial-based lenses and antennas, high-dimensional spatial multiplexing technologies using orbital angular momentum (OAM), and reconfigurable intelligent surface (RIS) are being discussed to improve the coverage of terahertz band signals.

Also, for frequency efficiency improvement and system network improvement, in the 6G communication systems, full duplex technologies in which the uplink and the downlink simultaneously use the same frequency resource at the same time, network technologies integratedly using satellites and high-altitude platform stations (HAPS) or the like, network architecture innovation technologies supporting mobile base stations or the like and enabling network operation optimization and automation or the like, dynamic spectrum sharing technologies through collision avoidance based on spectrum usage prediction, AI-based communication technologies realizing system optimization by using artificial intelligence (AI) from the design stage and internalizing an end-to-end AI support function, and next-generation distributed computing technologies realizing services of complexity exceeding the limit of terminal operation capacity by using ultra-high-performance communication and computing resources (e.g., mobile edge computing (MEC) and cloud) are being developed. In addition, through the design of new protocols to be used in the 6G communication systems, the implementation of hardware-based security environments, the development of mechanisms for safe use of data, and the development of technologies for maintaining privacy, attempts are being continuously made to further strengthen the connectivity between devices, further optimize the network, promote softwarization of network entities, and increase the openness of wireless communication.

Due to the research and development of the 6G communication systems, the next hyper-connected experience is expected to be possible through the hyper-connectivity of the 6G communication systems including not only the connection between things but also the connection between humans and things. Particularly, the 6G communication systems are predicted to provide services such as truly immersive extended reality (truly immersive XR), high-fidelity mobile hologram, and digital replica. Also, services such as remote surgery, industrial automation, and emergency response through security and reliability enhancement will be applied in various fields such as industry, medical care, vehicles, and home appliances by being provided through the 6G communication systems.

DESCRIPTION OF EMBODIMENTS

Technical Problem

Described embodiments provide an apparatus and method capable of effectively providing a service in a wireless communication system.

Solution to Problem

According to an embodiment of the present disclosure, a method performed by an integrated access and backhaul-mobile termination (IAB-MT) in a wireless communication system includes receiving configuration information for synchronization signal block (SSB) measurement, obtaining an SSB Measurement Time Configuration3 (SMTC3) list from the received configuration information, identifying cells and SSB measurement timing based on parameters included in the obtained SMTC3 list, and performing measurement of an SSB corresponding to an ssbToMeasure parameter included in the obtained SMTC3 list, for the identified cells, based on the SSB measurement timing.

Advantageous Effects of Disclosure

Described embodiments provide a signal transmitting/receiving method capable of effectively providing a service in a wireless communication system by providing synchronization signal configuration information.

BEST MODE

Figure 1:
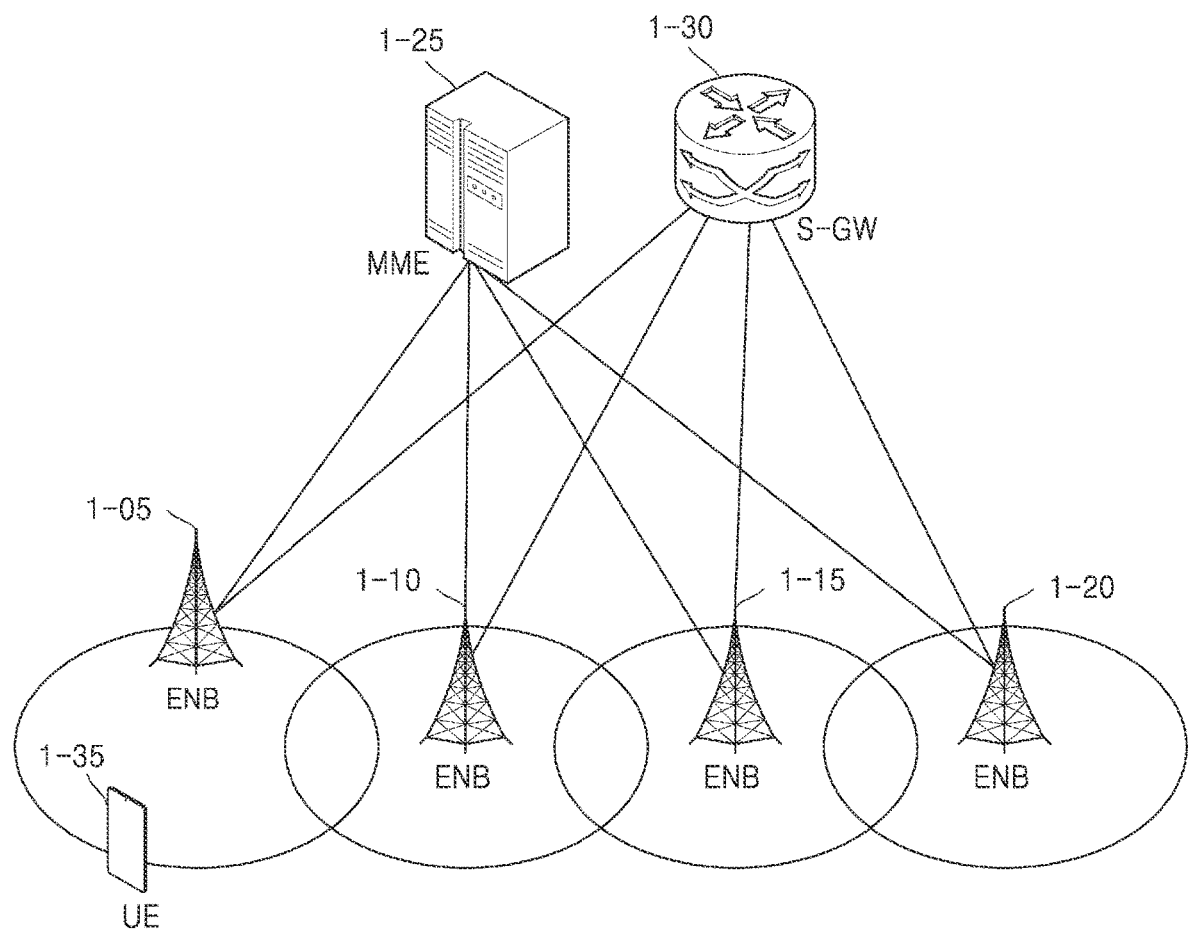
FIG. 1 is a diagram illustrating a structure of a Long Term Evolution (LTE) system.

When a terminal measures a reference signal to recognize a neighbor node, it may receive measurement information for a general terminal and measurement information for a mobile termination (MT) in one measurement object and measure each reference signal of a general cell and an integrated access and backhaul (IAB) neighbor node to report necessary cell information for the terminal to a base station.

The present disclosure relates to a method by which a mobile termination (MT) detects neighbor nodes in an integrated access and backhaul (IAB) system. According to an embodiment, when as reference signals configured by a donor base station, a reference signal configured by a base station for a general terminal and a reference signal additionally configured for neighbor nodes are simultaneously signaled, an MT having received the same may measure a signal for detecting a neighbor node by using two pieces of information. Also, according to an embodiment, a reference signal having multiple-frequency or single-frequency information may be configured for an MT having different types of capabilities, and depending on the capability, the MT may measure a signal received through multiple frequencies or may measure a signal received through a single frequency.

According to an embodiment of the present disclosure, a terminal may receive measurement configuration information from a serving cell, identify whether a measurement object (MO) configured in the terminal is an MO corresponding to a synchronization signal block (SSB) to be measured, based on the measurement configuration information, receive at least one SSB measurement time configuration (SMTC) information among SMTC1 information and SMTC3 information, based on a measurement frequency identified through the measurement configuration information and an SSB index configured through subcarrier spacing, when the MO corresponding to the SSB to be measured is configured in the terminal, and perform SSB measurement based on the received SMTC information.

According to an embodiment of the present disclosure, a method performed by an integrated access and backhaul-mobile termination (IAB-MT) in a wireless communication system includes receiving configuration information for synchronization signal block (SSB) measurement, obtaining an SSB Measurement Time Configuration3 (SMTC3) list from the received configuration information, identifying cells and SSB measurement timing based on parameters included in the obtained SMTC3 list, and performing measurement of an SSB corresponding to an ssbToMeasure parameter included in the obtained SMTC3 list, for the identified cells, based on the SSB measurement timing.

According to an embodiment of the present disclosure, a method performed by a base station in a wireless communication system includes transmitting configuration information for synchronization signal block (SSB) measurement, and transmitting at least one SSB, wherein the configuration information for the SSB measurement includes an SSB measurement time configuration 3 (SMTC3) list, cells and SSB measurement timing are identified based on parameters included in the SMTC3 list, and measurement of an SSB corresponding to an ssbToMeasure parameter included in the SMTC3 list is performed by an integrated access and backhaul-mobile termination (IAB-MT) for the identified cells based on the SSB measurement timing.

According to an embodiment of the present disclosure, an integrated access and backhaul-mobile termination (IAB-MT) in a wireless communication system includes a transceiver, and a processor configured to receive configuration information for synchronization signal block (SSB) measurement through the transceiver, obtain an SSB measurement time configuration 3 (SMTC3) list from the received configuration information, identify cells and SSB measurement timing based on parameters included in the obtained SMTC3 list, and perform measurement of an SSB corresponding to an ssbToMeasure parameter included in the obtained SMTC3 list, for the identified cells, based on the SSB measurement timing.

According to an embodiment of the present disclosure, a base station in a wireless communication system includes a transceiver, and a processor configured to transmit configuration information for synchronization signal block (SSB) measurement through the transceiver, and transmit at least one SSB through the transceiver, wherein the configuration information for the SSB measurement includes an SSB Measurement time configuration 3 (SMTC3) list, cells and SSB measurement timing are identified based on parameters included in the SMTC3 list, and measurement of an SSB corresponding to an ssbToMeasure parameter included in the SMTC3 list is performed by an integrated access and backhaul-mobile termination (IAB-MT) for the identified cells based on the SSB measurement timing.

MODE OF DISCLOSURE

Hereinafter, operation principles of the present disclosure will be described in detail with reference to the accompanying drawings. In the following description of the present disclosure, detailed descriptions of well-known functions or configurations will be omitted because they would unnecessarily obscure the subject matters of the present disclosure. Also, terms described below may be terms defined considering functions in the present disclosure and may vary according to users' or operators' intentions or practices. Therefore, the definition thereof should be made based on the content throughout the specification.

For the same reason, some components in the accompanying drawings may be exaggerated, omitted, or schematically illustrated. Also, the size of each component may not completely reflect the actual size thereof. In the drawings, the same or corresponding elements may be given the same reference numerals.

The advantages and features of the present disclosure and the accomplishing methods thereof will become apparent from the embodiments of the present disclosure described below in detail with reference to the accompanying drawings. The present disclosure may, however, be embodied in many different forms and should not be construed as being limited to the embodiments of the present disclosure described below; rather, the present embodiments are provided to complete the present disclosure and fully convey the scope of the present disclosure to those of ordinary skill in the art and the present disclosure will be defined only by the scope of the claims. Throughout the specification, like reference numerals may denote like elements.

It will be understood that each block of process flowchart diagrams and combinations of flowchart diagrams may be performed by computer program instructions. Because these computer program instructions may be mounted on a processor of a general-purpose computer, special-purpose computer, or other programmable data processing equipment, the instructions executed through a processor of a computer or other programmable data processing equipment may generate a means of performing the functions described in the flowchart block(s). Because these computer program instructions may be stored in a computer-executable or computer-readable memory that may be directed to a computer or other programmable data processing equipment to implement a function in a particular manner, the instructions stored in the computer-executable or computer-readable memory may also produce a production item containing an instruction means of performing the functions described in the flowchart block(s). Because the computer program instructions may also be mounted on a computer or other programmable data processing equipment, the instructions performing a series of operations on the computer or other programmable data processing equipment to generate a computer-implemented process to perform the computer or other programmable data processing equipment may also provide operations for executing the functions described in the flowchart block(s).

Also, each block may represent a portion of a module, segment, or code including one or more executable instructions for executing one or more specified logical functions. Also, it should be noted that the functions mentioned in the blocks may also occur in a different order in some alternative implementation examples. For example, two blocks illustrated in succession may actually be performed substantially at the same time or may sometimes be performed in the opposite order depending on the corresponding function.

In this case, the term "unit" used in the present embodiments may refer to a software component or a hardware component such as a field programmable gate array (FPGA) or an application specific integrated circuit (ASIC) and the "unit" may perform certain functions. However, the "unit" is not limited to software or hardware. The "unit" may be configured to be in an addressable storage medium or may be configured to operate one or more processors. Thus, as an example, the "unit" may include components such as software components, object-oriented software components, class components, and task components and may include processes, functions, attributes, procedures, subroutines, segments of program code, drivers, firmware, microcode, circuits, data, databases, data structures, tables, arrays, and variables. A function provided by the components and "units" may be associated with the smaller number of components and "units" or may be further divided into additional components and "units". In addition, the components and "units" may be implemented to operate one or more central processing units (CPUs) in a device or a security multimedia card. Also, in embodiments, the "unit" may include one or more processors.

In the following description, terms for identifying access nodes, terms referring to network entities, terms referring to messages, terms referring to interfaces between network entities, terms referring to various identification information, and the like are used for convenience of descriptions. Thus, the present disclosure is not limited to the terms used below and other terms referring to objects having equivalent technical meanings may be used.

In the following description, terms and names defined in the 3rd Generation Partnership Project Long Term Evolution (3GPP LTE) standards may be used for convenience of description. However, the present disclosure is not limited to those terms and names and may be equally applied to systems according to other standards.

FIG. 1 is a diagram illustrating a structure of an LTE system.

Referring to FIG. 1, as illustrated, a radio access network of the LTE system may include next-generation base stations (e.g., evolved Node Bs (eNBs), Node Bs, or base stations) 1-05, 1-10, 1-15, and 1-20, a mobility management entity (MME) 1-25, and a serving-gateway (S-GW) 1-30. A user terminal (e.g., a user equipment (UE) or a terminal) 1-35 may access an external network through the eNBs 1-05 to 1-20 and the S-GW 1-30.

In FIG. 1, the eNBs 1-05 to 1-20 may correspond to the existing Node Bs of the UMTS system. The eNB may be connected to the UE 1-35 through a radio channel and may perform a more complex function than the existing Node B. In the LTE system, all user traffic including real-time services such as Voice over IP (VoIP) through the Internet protocol may be serviced on a shared channel Thus, a device for collecting and scheduling state information such as the buffer states of UEs, available transmission power states, and channel states may be required, which may be performed by the eNBs 1-05 to 1-20. One eNB may generally control a plurality of cells. For example, in order to implement a transmission rate of 100 Mbps, the LTE system may use Orthogonal Frequency Division Multiplexing (OFDM) as a radio access technology in a 20 MHz bandwidth. Also, an adaptive modulation & coding (AMC) scheme may be applied to determine a modulation scheme and a channel coding rate according to the channel state of a terminal. The S-GW 1-30 may be a device for providing a data bearer and may add or release a data bearer based on the control by the MME 1-25. The MME 1-25 may be an entity for performing various control functions as well as a mobility management function for a terminal and may be connected to a plurality of base stations.

Figure 2:
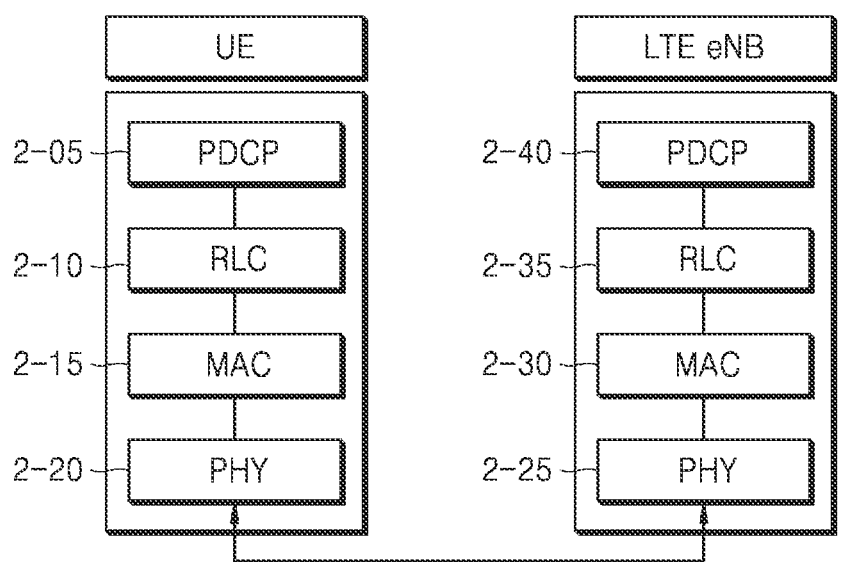
FIG. 2 is a diagram illustrating a radio protocol architecture of an LTE system.

FIG. 2 is a diagram illustrating a radio protocol architecture of an LTE system.

Referring to FIG. 2, the radio protocol of the LTE system may include Packet Data Convergence Protocol (PDCP) 2-05 and 2-40, Radio Link Control (RLC) 2-10 and 2-35, and Medium Access Control (MAC) 2-15 and 2-30 in each of a terminal and an eNB. The PDCP may perform operations such as IP header compression/decompression. The main functions of the PDCP may be summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC 2-10 and 2-35 may reconfigure a PDCP packet data unit (PDU) in a suitable size to perform an ARQ operation or the like. The main functions of the RLC 2-10 and 2-35 may be summarized as follows.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC 2-15 and 2-30 may be connected to several RLC entities configured in one terminal and may perform an operation of multiplexing RLC PDUs into MAC PDUs and demultiplexing RLC PDUs from MAC PDUs. The main functions of the MAC 2-15 and 2-30 may be summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical layers 2-20 and 2-25 may channel-code and modulate upper layer data, generate OFDM symbols, and transmit the same through radio channels or may demodulate and channel-decode OFDM symbols received through radio channels and transmit the result thereof to the upper layer.

Figure 3:
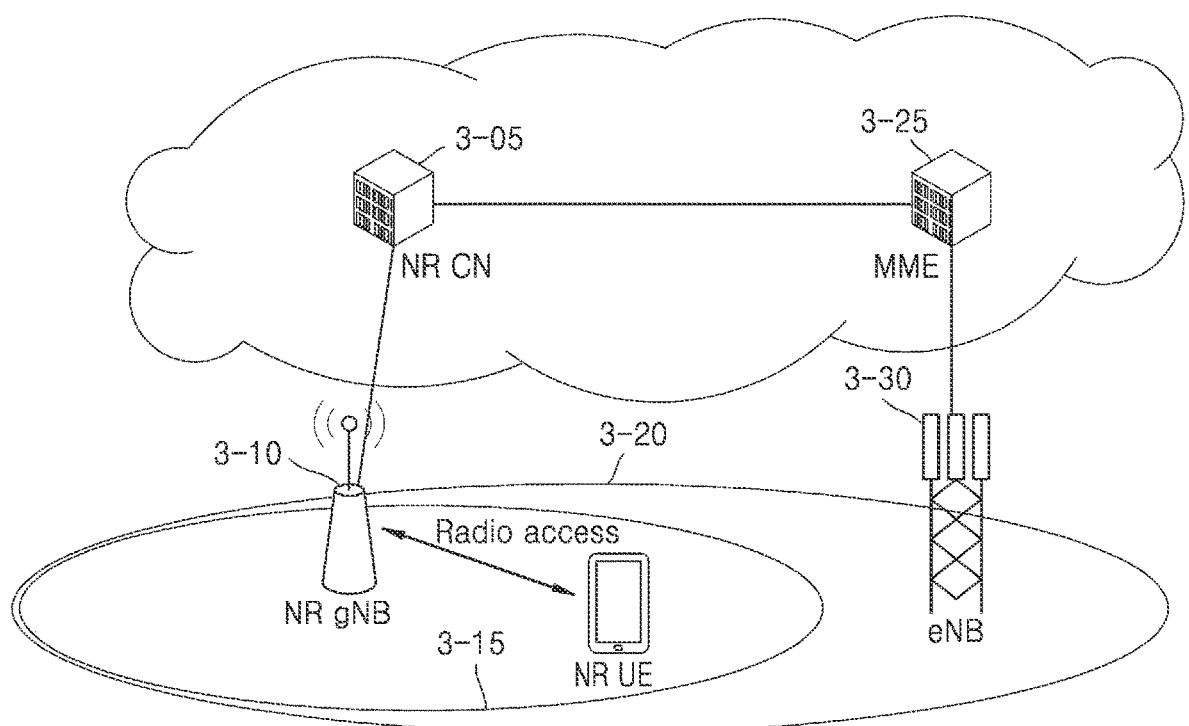
FIG. 3 is a diagram illustrating a structure of a next-generation mobile communication system to which the present disclosure may be applied.

FIG. 3 is a diagram illustrating a structure of a next-generation mobile communication system.

Referring to FIG. 3, a radio access network of the next-generation mobile communication system (hereinafter NR or 2G) may include a next-generation base station (new radio Node B) (hereinafter NR gNB or NR base station) 3-10 and a next-generation radio core network (new radio core network (NR CN)) 3-05. A next-generation radio user terminal (new radio user equipment (NR UE) or terminal) 3-15 may access an external network through the NR gNB 3-10 and the NR CN 3-05.

In FIG. 3, the NR gNB 3-10 may correspond to an evolved Node B (eNB) of the existing LTE system. The NR gNB may be connected to the NR UE 3-15 through a radio channel and may provide a better service than the existing Node B. In the next-generation mobile communication system, all user traffic may be serviced on a shared channel Thus, a device for collecting and scheduling state information such as the buffer states of UEs, available transmission power states, and channel states may be required, which may be performed by the NR NB 3-10. One NR gNB may generally control a plurality of cells. In the next-generation mobile communication system, a bandwidth larger than or equal to the current maximum bandwidth may be applied to implement ultra-high-speed data transmission compared to the current LTE. Also, a beamforming technology may be additionally combined by using Orthogonal Frequency Division Multiplexing (OFDM) as a radio access technology. Also, an adaptive modulation & coding (AMC) scheme may be applied to determine a modulation scheme and a channel coding rate according to the channel state of a terminal. The NR CN 3-05 may perform functions such as mobility support, bearer configuration, and Quality of Service (QoS) configuration. The NR CN may be an apparatus for performing various control functions as well as a mobility management function for a terminal and may be connected to a plurality of base stations. Also, the next-generation mobile communication system may also be linked with the existing LTE system, and the NR CN may be connected to an MME 3-25 through a network interface. The MME may be connected to an eNB 3-30 that is an existing base station.

Figure 4:
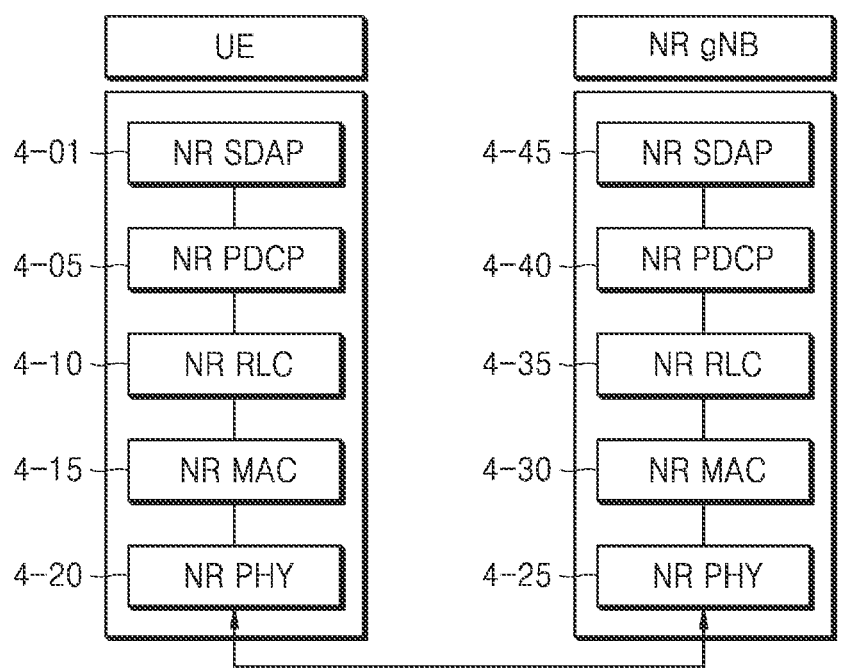
FIG. 4 is a diagram illustrating a radio protocol architecture of a next-generation mobile communication system to which the present disclosure may be applied.

FIG. 4 is a diagram illustrating a radio protocol architecture of a next-generation mobile communication system to which the present disclosure may be applied.

Referring to FIG. 4, the radio protocol of the next-generation mobile communication system may include NR Service Data Adaptation Protocol (SDAP) 4-01 and 4-45, NR PDCP 4-05 and 4-40, NR RLC 4-10 and 4-35, and NR MAC 4-15 and 4-30 in each of a terminal and an NR base station.

The main functions of the NR SDAP 4-01 and 4-45 may include some of the following functions.

Transfer of user plane data
Mapping between a QoS flow and a DRB for both DL and UL
Marking QoS flow ID in both DL and UL packets
Reflective QoS flow to DRB mapping for the UL SDAP PDUs As for an SDAP entity, the terminal may be configured with a Radio Resource Control (RRC) message for each PDCP entity, for each bearer, or for each logical channel whether to use a header of the SDAP entity or whether to use a function of the SDAP entity. When an SDAP header is configured, a 1-bit non-access stratum (NAS) Quality of Service (QoS) reflection configuration indicator (NAS reflective QoS) and a 1-bit access stratum (AS) QoS reflection configuration indicator (AS reflective QoS) of the SDAP header may indicate the terminal to update or reconfigure mapping information between a QoS flow and a data bearer for the uplink and the downlink. The SDAP header may include QoS flow ID information representing the QoS. The QoS information may be used as data processing priority and scheduling information or the like to support a smooth service.

The main functions of the NR PDCP 4-05 and 4-40 may include at least some of the following functions.

Header compression and decompression; ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink In the above description, the reordering function of the NR PDCP entity may mean a function of reordering the PDCP PDUs received from the lower layer in order based on a PDCP sequence number (SN). The reordering function of the NR PDCP entity may include a function of transmitting data to the upper layer in the reordered order and may include at least one of a function of directly transmitting data without considering the order, a function of rearranging the order and recording the missing PDCP PDUs, a function of reporting the state of the missing PDCP PDUs to the transmitting side, or a function of requesting retransmission of the missing PDCP PDUs.

The main functions of the NR RLC 4-10 and 4-35 may include at least some of the following functions.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above description, the sequential transmission (in-sequence delivery) function of the NR RLC entity may mean a function of sequentially transmitting the RLC SDUs received from the lower layer to the upper layer. When one original RLC SDU is divided into multiple RLC SDUs and then received, the sequential transmission (in-sequence delivery) function of the NR RLC entity may include a function of reassembling and then transmitting the same.

The sequential transmission (in-sequence delivery) function of the NR RLC entity may include a function of rearranging the received RLC PDUs based on the RLC sequence number (SN) or the sequence number (SN), may include a function of rearranging the order and recording the missing RLC PDUs, may include a function of reporting the state of the missing RLC PDUs to the transmitting side, and may include a function of requesting retransmission of the missing RLC PDUs.

The sequential transmission (in-sequence delivery) function of the NR RLC entity may include a function of sequentially transmitting, when there is a missing RLC SDU, only the RLC SDUs up to before the missing RLC SDU to the upper layer.

The sequential transmission (in-sequence delivery) function of the NR RLC entity may include a function of sequentially transmitting all RLC SDUs received before the start of a timer to the upper layer, when a certain timer has expired even when there is a missing RLC SDU.

The sequential transmission (in-sequence delivery) function of the NR RLC entity may include a function of sequentially transmitting all RLC SDUs received up to now to the upper layer, when a certain timer has expired even when there is a missing RLC SDU.

The NR RLC entity may process the RLC PDUs in the order of reception regardless of the sequence number (out-of-sequence delivery) and transmit the same to the NR PDCP entity.

In the case of receiving segments, the NR RLC entity may receive segments stored in a buffer or to be received, reconfigure the segments into a single RLC PDU, and then transmit the same to the NR PDCP entity.

The NR RLC layer may not include the concatenation function, and this function may be performed in the NR MAC layer or may be replaced with the multiplexing function of the NR MAC layer.

In the above description, the non-sequential transmission (out-of-sequence delivery) function of the NR RLC entity may mean a function of directly transmitting the RLC SDUs received from the lower layer to the upper layer regardless of the order thereof. When one original RLC SDU is divided into multiple RLC SDUs and then received, the non-sequential transmission (out-of-sequence delivery) function of the NR RLC entity may include a function of reassembling and then transmitting the same. The non-sequential transmission (out-of-sequence delivery) function of the NR RLC entity may include a function of storing the RLC SN or PDCP SN of the received RLC PDUs, arranging the order thereof, and recording the missing RLC PDUs.

The NR MAC 4-15 and 4-30 may be connected to multiple NR RLC entities configured in one terminal, and the main functions of the NR MAC may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR PHY layers 4-20 and 4-25 may channel-code and modulate upper layer data, generate OFDM symbols, and transmit the same on radio channels or may demodulate and channel-decode OFDM symbols received on radio channels and transmit the results thereof to the upper layer.

Figure 5:
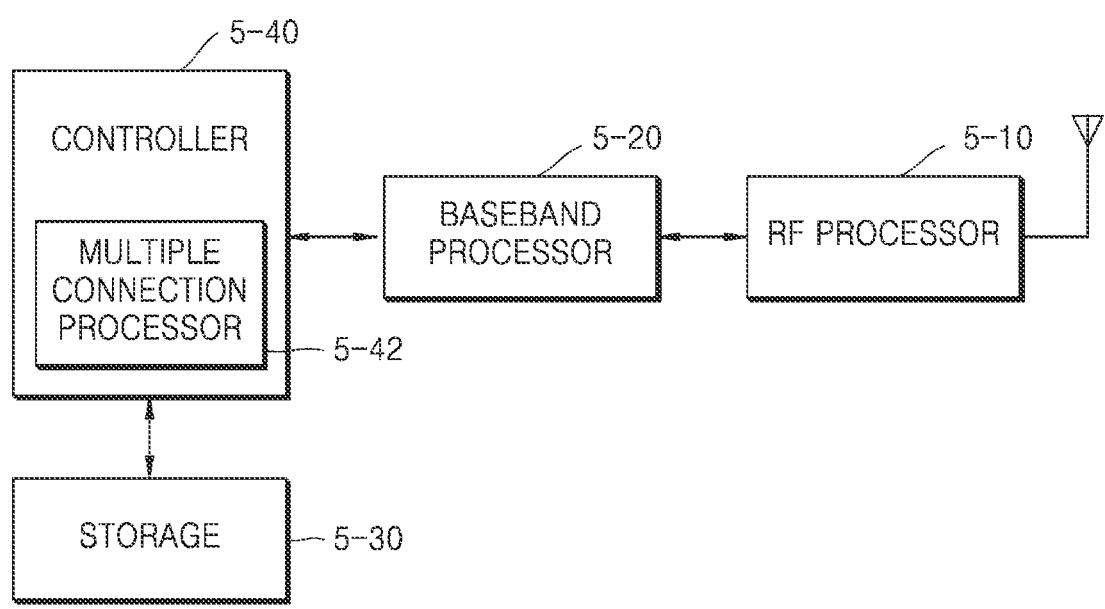
FIG. 5 is a block diagram illustrating a configuration of a terminal to which the present disclosure is applied.

FIG. 5 is a block diagram of a terminal according to an embodiment of the present disclosure.

Referring to FIG. 5, the terminal may include a radio frequency (RF) processor 5-10, a baseband processor 5-20, a storage 5-30, and a controller 5-40.

The RF processor 5-10 may perform functions for transmitting or receiving signals through radio channels, such as band conversion and amplification of signals. That is, the RF processor 5-10 may up-convert a baseband signal provided from the baseband processor 5-20 into an RF band signal and transmit the same through an antenna and may down-convert an RF band signal received through the antenna into a baseband signal. For example, the RF processor 5-10 may include a transmission filter, a reception filter, an amplifier, a mixer, an oscillator, a digital-to-analog converter (DAC), and an analog-to-digital converter (ADC). However, this is merely an example, and the configuration of the RF processor 5-10 is not limited to the above example. Also, although only one antenna is illustrated in the embodiment of FIG. 5, the terminal may include a plurality of antennas. Also, the RF processor 5-10 may include a plurality of RF chains. In addition, the RF processor 5-10 may perform beamforming. For beamforming, the RF processor 5-10 may adjust the phase and magnitude of each of the signals transmitted or received through a plurality of antennas or antenna elements. Also, the RF processor 5-10 may perform multiple-input and multiple-output (MIMO) and may receive multiple layers when performing a MIMO operation.

The baseband processor 5-20 may perform a conversion function between a baseband signal and a bit string according to the physical layer standard of the system. For example, during data transmission, the baseband processor 5-20 may generate complex symbols by encoding and modulating a transmission bit string. Also, during data reception, the baseband processor 5-20 may restore a reception bit string by demodulating and decoding the baseband signal provided from the RF processor 5-10. For example, according to an OFDM scheme as a radio access technology, during data transmission, the baseband processor 5-20 may generate complex symbols by encoding and modulating a transmission bit string, map the complex symbols to subcarriers, and then configure OFDM symbols through an inverse fast Fourier transform (IFFT) operation and cyclic prefix (CP) insertion. Also, during data reception, the baseband processor 5-20 may divide the baseband signal provided from the RF processor 5-10 into OFDM symbol units, restore signals mapped to the subcarriers through a fast Fourier transform (FFT) operation, and then restore a reception bit string through demodulation and decoding.

The baseband processor 5-20 and the RF processor 5-10 may transmit and receive signals as described above. Accordingly, the baseband processor 5-20 and the RF processor 5-10 may be referred to as a transmitter, a receiver, a transceiver, or a communicator. In addition, at least one of the baseband processor 5-20 and the RF processor 5-10 may include a plurality of communication modules to support a plurality of different radio access technologies. Also, at least one of the baseband processor 5-20 and the RF processor 5-10 may include a plurality of communication modules to process signals of different frequency bands. For example, the different radio access technologies may include wireless LAN (e.g., IEEE 802.11) and cellular network (e.g., LTE). Also, the different frequency bands may include a super high frequency (SHF) (e.g., 2.5 GHz or 5 GHz) band and a millimeter wave (e.g., 60 GHz) band.

The storage 5-30 may store data such as a basic program, an application program, or configuration information for operation of the terminal. Particularly, the storage 5-30 may store information related to a second access node performing wireless communication by using a second radio access technology. Also, the storage 5-30 may provide the stored data at the request of the controller 5-40.

The controller 5-40 may control overall operations of the terminal. For example, the controller 5-40 may transmit/receive signals through the baseband processor 5-20 and the RF processor 5-10. Also, the controller 5-40 may write/read data into/from the storage 5-30. For this purpose, the controller 5-40 may include at least one processor. For example, the controller 5-40 may include a communication processor (CP) for performing control for communication and an application processor (AP) for controlling an upper layer such as an application program.

Figure 6:
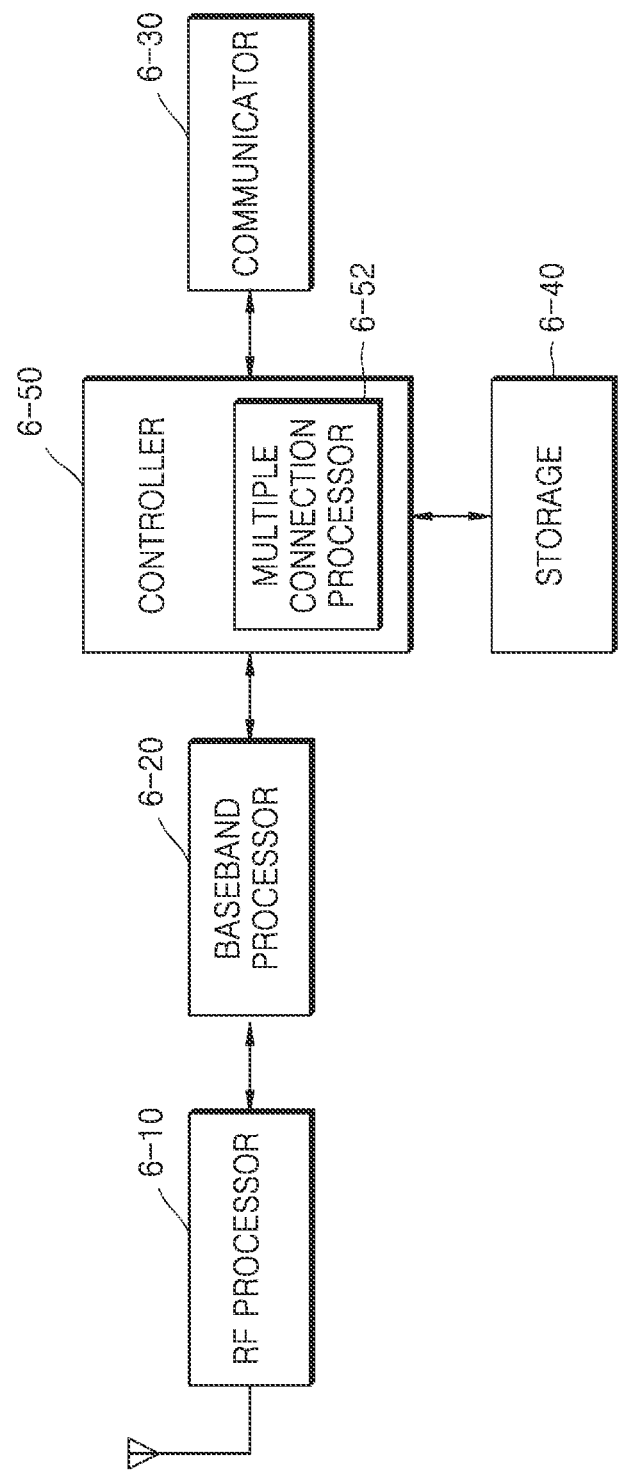
FIG. 6 is a block diagram illustrating a configuration of a new radio (NR) base station according to the present disclosure.

FIG. 6 is a block diagram of an NR base station according to an embodiment of the present disclosure.

Referring to FIG. 6, the base station may include an RF processor 6-10, a baseband processor 6-20, a backhaul communicator 6-30, a storage 6-40, and a controller 6-50.

The RF processor 6-10 may perform functions for transmitting or receiving signals through radio channels, such as band conversion and amplification of signals. That is, the RF processor 6-10 may up-convert a baseband signal provided from the baseband processor 6-20 into an RF band signal and transmit the same through an antenna and may down-convert an RF band signal received through the antenna into a baseband signal. For example, the RF processor 6-10 may include a transmission filter, a reception filter, an amplifier, a mixer, an oscillator, a DAC, and an ADC. However, this is merely an example, and the configuration of the RF processor 6-10 is not limited to the above example. Moreover, although only one antenna is illustrated in the embodiment of FIG. 6, the base station may include a plurality of antennas. Also, the RF processor 6-10 may include a plurality of RF chains. In addition, the RF processor 6-10 may perform beamforming. For beamforming, the RF processor 6-10 may adjust the phase and magnitude of each of the signals transmitted/received through a plurality of antennas or antenna elements. The RF processor 6-10 may perform a downlink MIMO operation by transmitting one or more layers.

The baseband processor 6-20 may perform a conversion function between a baseband signal and a bit string according to the physical layer standard of a first radio access technology. For example, during data transmission, the baseband processor 6-20 may generate complex symbols by encoding and modulating a transmission bit string. Also, during data reception, the baseband processor 6-20 may restore a reception bit string by demodulating and decoding the baseband signal provided from the RF processor 6-10. For example, according to the OFDM scheme, during data transmission, the baseband processor 6-20 may generate complex symbols by encoding and modulating a transmission bit string, map the complex symbols to subcarriers, and then configure OFDM symbols through an IFFT operation and CP insertion. Also, during data reception, the baseband processor 6-20 may divide the baseband signal provided from the RF processor 6-10 into OFDM symbol units, restore signals mapped to the subcarriers through an FFT operation, and then restore a reception bit string through demodulation and decoding. The baseband processor 6-20 and the RF processor 6-10 may transmit and receive signals as described above. Accordingly, the baseband processor 6-20 and the RF processor 6-10 may be referred to as a transmitter, a receiver, a transceiver, a communicator, or a wireless communicator.

The backhaul communicator 6-30 may provide an interface for communicating with other nodes in the network. That is, the backhaul communicator 6-30 may convert a bit string transmitted from the base station to another node, for example, an auxiliary base station, a core network, or the like, into a physical signal and may convert a physical signal received from another node into a bit string.

The storage 6-40 may store data such as a basic program, an application program, or configuration information for operation of the main base station. Particularly, the storage 6-40 may store information about a bearer allocated to a connected terminal, a measurement result reported from the connected terminal, or the like. Also, the storage 6-40 may store information that is a reference for determining whether to provide or terminate multiple connections to the terminal. Also, the storage 6-40 may provide the stored data at the request of the controller 6-50.

The controller 6-50 may control overall operations of the base station. For example, the controller 6-50 may transmit/receive signals through the baseband processor 6-20 and the RF processor 6-10 or through the backhaul communicator 6-30. Also, the controller 6-50 may write/read data into/from the storage 6-40. For this purpose, the controller 6-50 may include at least one processor.

Hereinafter, the following abbreviations will be used in the present disclosure.

SSB: Synchronization signal block.

Smtc: SSB measurement time configuration.

Smtc occasion: Time when SSB is transmitted. Smtc occasion is calculated through smtc configuration information, and terminal measures SSB in calculated occasion.

MT: Mobile termination, as a unit performing function of terminal in IAB system, it is discriminated from general terminal from the viewpoint of IAB.

IAB system: Integrated access and backhaul system, that is, access and backhaul combined system.

MO: Measurement object. Object given when base station requests terminal for measurement.

Smtc periodicity: Period when smtc occasion is repeated.

Smtc offset: As a time when smtc occasion is started, when periodicity and offset are given, smtc occasion may be formed in subframe and SFN of spcell satisfying the following condition.

<Condition>

SFN mod $T$=(FLOOR(Offset/10));

if the Periodicity is larger than sf5:

subframe=Offset mod 10;

else:

subframe=Offset or (Offset+5);

with T=CEIL(Periodicity/10).

Smtc duration: Duration when ssb is measurable from smtc occasion.

ssbToMeasure: Information representing ssb index to perform measurement as bit map when measuring ssb with respect to particular smtc. Left most bit may represent ssb index 0 or 1, and the next bit may represent ssb index 1 or 2.

Figure 7:
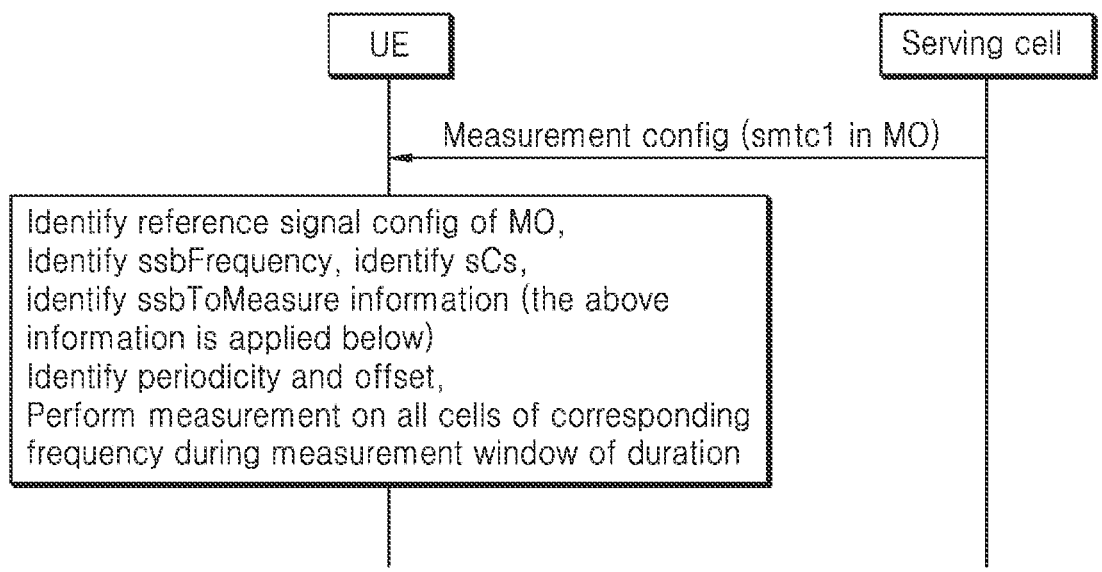
FIG. 7 is a diagram for describing an operation when a mobile termination (MT) receives smtc configuration to measure a normal neighbor cell, according to an embodiment.

FIG. 7 is a diagram for describing an operation when an MT receives smtc configuration to measure a normal neighbor cell, according to an embodiment.

The MT may receive measurement configuration information from a serving cell. In the measurement configuration information, a measurement object and a report configuration may be transmitted in pair, wherein the report configuration is information indicating on which condition measurement of the measurement object is to be reported to the base station.

Upon receiving the measurement configuration information, the MT may identify reference signal configuration information included in the measurement object (MO) to identify whether the MO is an MO corresponding to an SSB to be measured. As a result of the identification, when the SSB is to be measured, the MT may again identify a measurement frequency through ssbFrequency information and may also identify subcarrier spacing information. Also, through ssbToMeasure, the terminal may be configured with an index of an SSB to be measured. Thereafter, the terminal may receive smtc1-related information and calculate an smtc occasion through the related information. Information included in the smtc1 may be smtc periodicity, offset value, and duration.

For a given frequency ssbFrequency, the MT may measure an SSB for all cells in the calculated smtc occasion.

Figure 8:
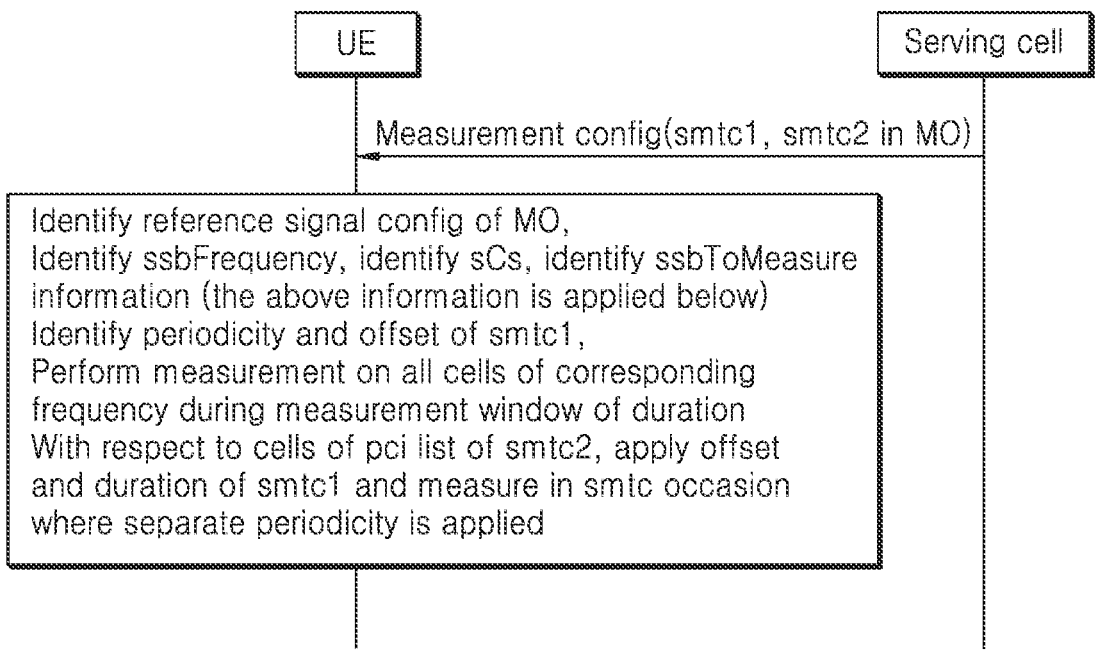
FIG. 8 is a diagram for describing an operation when an MT receives smtc configuration and short-period smtc configuration to measure a normal neighbor cell, according to an embodiment.

FIG. 8 is a diagram for describing an operation when an MT receives smtc configuration and short-period smtc configuration to measure a normal neighbor cell, according to an embodiment.

The MT may receive measurement configuration information from a serving cell. In the measurement configuration information, a measurement object and a report configuration may be transmitted in pair, wherein the report configuration is information indicating on which condition the MT is to report measurement of the measurement object to the base station.

Upon receiving the measurement configuration information, the MT may identify reference signal configuration information included in the measurement object (MO) to identify whether the MO is an MO corresponding to an SSB to be measured. As a result of the identification, when the MO corresponds to the SSB to be measured, the MT may again identify a measurement frequency through ssbFrequency information and may also identify subcarrier spacing information. Also, through ssbToMeasure, the terminal may be configured with an index of an SSB to be measured. Thereafter, the terminal may receive smtc1-related information and calculate an smtc occasion through the related information. Information included in the smtc1 may be smtc periodicity, offset value, and duration.

For a given frequency ssbFrequency, the MT may measure an SSB for all cells in the calculated smtc occasion. Also, smtc2 may be configured together with smtc1 in a given measurement object, and a periodicity and a pci list may be separately included in smtc2. For a given ssbFrequency frequency and subcarrier spacing, the MT may calculate an smtc2 occasion by applying an offset value and duration included in smtc1 and applying a periodicity value separately applied to smtc2. The terminal may perform SSB measurement in the smtc2 occasion only for the cells included in the pci list separately configured in smtc2.

Figure 9:
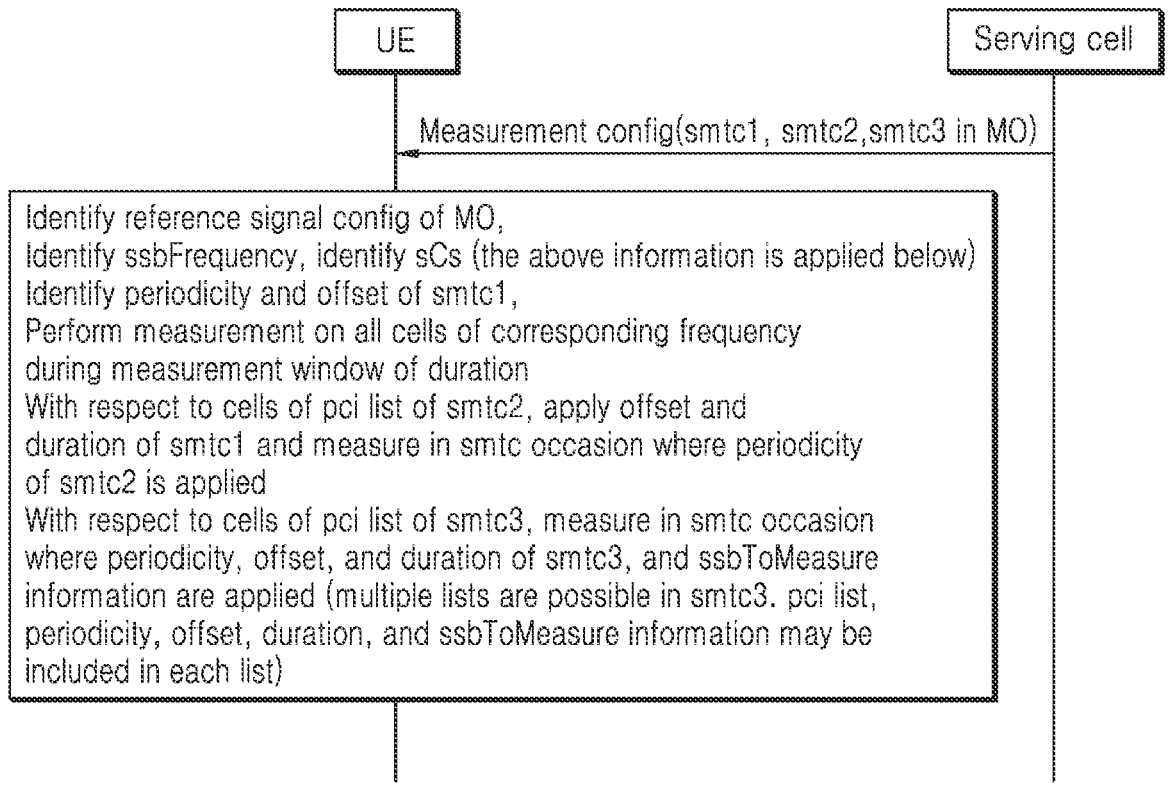
FIG. 9 is a diagram for describing an operation when an MT receives smtc1, smtc2, and smtc3 configurations to measure a normal neighbor cell and an integrated access and backhaul (IAB) node neighbor cell, according to an embodiment.

FIG. 9 is a diagram for describing an operation when an MT receives smtc1, smtc2, and smtc3 configurations to measure a normal neighbor cell and an IAB node neighbor cell, according to an embodiment.

The embodiment of FIG. 9 may correspond to a case where the MT ignores an smtc1 signal.

The MT may receive measurement configuration information from a serving cell. In the measurement configuration information, a measurement object and a report configuration may be transmitted in pair, wherein the report configuration is information indicating on which condition measurement of the measurement object is to be reported to the base station.

Upon receiving the measurement configuration information, the MT may identify reference signal configuration information included in the measurement object (MO) to identify whether the MO is an MO corresponding to an SSB to be measured. When the MO corresponds to the SSB to be measured, the MT may again identify a measurement frequency through ssbFrequency information and may also identify subcarrier spacing information. Also, through ssbToMeasure, the terminal may be configured with an index of an SSB to be measured. Thereafter, the terminal may receive smtc1-related information and calculate an smtc occasion through the related information. Information included in the smtc1 may be smtc periodicity, offset value, and duration. For a given frequency ssbFrequency, the MT may measure an SSB for all cells in the calculated smtc occasion.

Also, smtc3 information may be transmitted together with smtc1 in the MO. The smtc3 information may include smtc periodicity, offset, duration, ssbToMeasure, and pci list information. Upon receiving the information, the MT may determine an smtc3 occasion through the periodicity, offset, and duration and measure an SSB id corresponding to given ssbToMeasure. In this case, an object to be measured may be limited to the cells existing in a given pci list. In another embodiment, smtc3 may exist as a list, and periodicity, offset, duration, ssbToMeasure, and pci list may exist separately in each list. Smtc3 occasions may be determined by the number of lists according to the periodicity, offset, duration, ssbToMeasure, and pci list existing in each list, and the MT may measure an ssb only for the cells of the pci list associated with each of the multiple smtc3 occasions.

When the MT is simultaneously configured with both smtc1 information and smtc3 information in one MO, the smtc3 information may be prioritized. That is, the MT may not measure all the cells in the smtc1 occasion but may only perform measurement corresponding to the smtc3 occasion.

Figure 10:
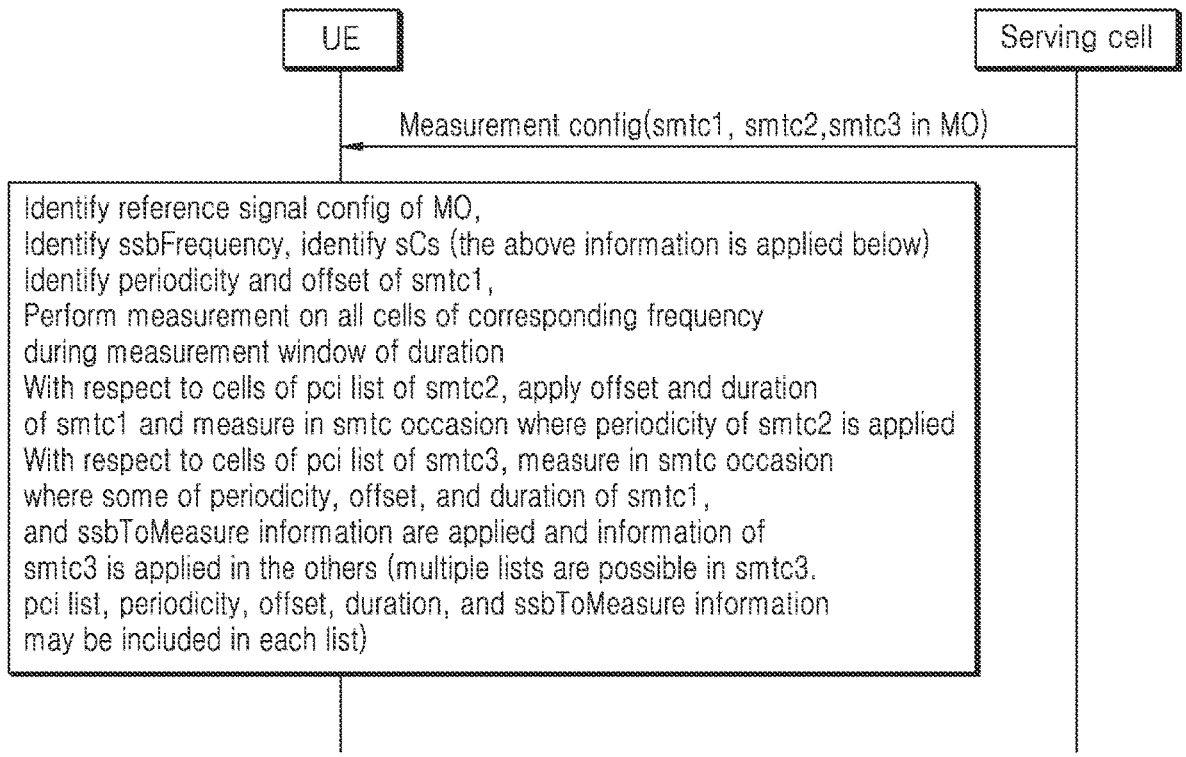
FIG. 10 is a diagram for describing an operation when an MT receives smtc1, smtc2, and smtc3 configurations to measure a normal neighbor cell and an IAB node neighbor cell.

FIG. 10 is a diagram for describing an operation when an MT receives smtc1, smtc2, and smtc3 configurations to measure a normal neighbor cell and an IAB node neighbor cell.

The embodiment of FIG. 10 may correspond to a case where the MT reuses some information of smtc1.

The MT may receive measurement configuration information from a serving cell. In the measurement configuration information, a measurement object and a report configuration may be transmitted in pair, wherein the report configuration is information indicating on which condition measurement of the measurement object is to be reported to the base station.

Upon receiving the measurement configuration information, the MT may identify reference signal configuration information included in the measurement object (MO) to identify whether the MO is an MO corresponding to an SSB to be measured. As a result of the identification, when the MO corresponds to the SSB to be measured, the MT may again identify a measurement frequency through ssbFrequency information and may also identify subcarrier spacing information. Also, through ssbToMeasure, the terminal may be configured with an index of an SSB to be measured. Thereafter, the terminal may receive smtc1-related information and calculate an smtc occasion through the related information. Information included in the smtc1 may be smtc periodicity, offset value, and duration. For a given frequency ssbFrequency, the MT may measure an SSB for all cells in the calculated smtc occasion.

Smtc3 information may be transmitted together with smtc1 in the MO. Here, the smtc3 information may include smtc periodicity, offset, duration, ssbToMeasure, and pci list information. When a portion of the information is missing, the portion may be replaced with information configured in smtc1. For example, when the offset information is missing in smtc3, the MT may calculate the occasion of smtc3 by using the offset information in smtc1 and measure an ssb for the cells of the pci list corresponding thereto. When the missing information of smtc3 is supplemented through the reuse of the information of smtc1, the MT may determine an smtc3 occasion through the supplemented periodicity, offset, and duration and measure SSB ids corresponding to given ssbToMeasure. In this case, an object to be measured may be limited to the cells existing in a given pci list. In another embodiment, smtc3 may exist as a list, and periodicity, offset, duration, ssbToMeasure, and pci list may exist separately in each list. Accordingly, smtc3 occasions may be determined by the number of lists, and the MT may measure an ssb only for the cells of the pci list associated with each of the multiple smtc3 occasions.

When smtc1 and smtc3 are configured in one MO and the configuration information of smtc3 is insufficient (i.e., when there is no one of pci list, periodicity, offset, duration, and ssbToMeasure information), the MT may perform ssb measurement on the smtc occasions of both smtc1 and smtc3. In this case, an ssb may be measured for all the cells in the case of smtc1, and an ssb may be measured only for the cells included in a given pci list in the case of smtc3.

Figure 11:
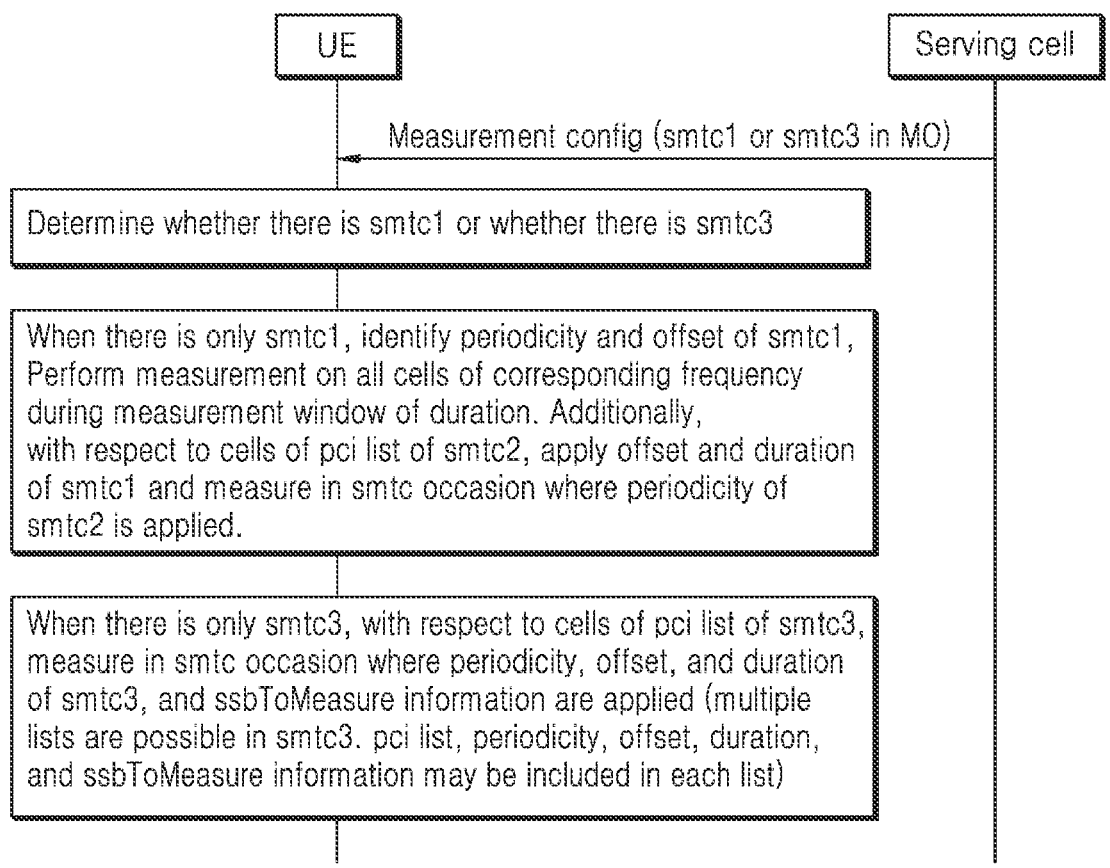
FIG. 11 is a diagram for describing a case where a network configures only one of smtc1 or smtc3 when configuring a measurement object for measurement by an MT.

FIG. 11 is a diagram for describing a case where a network configures only one of smtc1 or smtc3 when configuring a measurement object for measurement by an MT.

Embodiment of FIG. 11 may correspond to a case where the network configures only one of smtc1 or smtc3 in one MO.

In this case, related information may be conditionally configured in the MO.

That is, ssbFrequency information and ssbSubcarrierSpacing information may be configured only in the condition of SSBorAssociatedSSB2.

Smtc1 information may be configured only in the condition of SSBorAssociatedSSB2.

Also, referenceSignalConfig information configured for the type of a reference signal, that is, ssb or csi-rs, may be configured only in the condition of Not_IABMT as conditional information instead of mandatory information. This is illustrated below.

| MeasObjectNR information element |
| --- |
| -- ASN1START |
| -- TAG-MEASOBJECTNR-START |
| MeasObjectNR ::=                     SEQUENCE { |
|    ssbFrequency                      ARFCN- |
| ValueNR                                             OPTIONAL,  -- Cond SSBorAssociatedSSB2 |
|    ssbSubcarrierSpacing              SubcarrierSpacing |
|    OPTIONAL,  -- Cond SSBorAssociatedSSB2 |
|    smtc1                             SSB- |
| MTC                                                 OPTIONAL,  --Cond SSBorAssociatedSSB1 |
|    smtc2                             SSB- |
| MTC2                                                OPTIONAL,  -- Cond IntraFreqConnected |
|    refFreqCSI-RS                     ARFCN- |

| MeasObjectNR information element |
| --- |
| ValueNR                                                        OPTIONAL,  -- Cond CSI-RS<br>   referenceSignalConfig                ReferenceSignalConfig,<br>OPTIONAL,  -- Cond Not_IABMT<br><<<<<<<Unrelated part omitted.......... .>>>>><br>[ [<br>   smtc3list-r16                       SSB-MTC3List-<br>r16                                                 OPTIONAL,  -- Cond IAB-MT<br>] ]<br>}<br>SSB-MTC3List-r16: :=          SEQUENCE (SIZE(1..4)) OF SSB- MTC3-r16<br>SSB-MTC3-r16                  SEQUENCE {<br>      ssb-MTC-Periodicity-r16          ENUMERATED {ms5, ms10, ms20, ms40, ms80, ms160, ms320,<br>ms640, ms1280},<br>      ssb-MTC-Timingoffset-r16          INTEGER (0..127),<br>      ssb-MTC-Duration-r16             ENUMERATED {sf1, sf2, s f3, sf4, sf5},<br>      ssb-MTC-pci-List-r16             SEQUENCE (SIZE (0..63)) OF PhysCellId,<br>      ssb-ToMeasure-r16                SetupRelease { SSB-<br>ToMeasure }                                 OPTIONAL  -- Need M<br>   } |

The definition of each condition may be as in the following table.

| | |
| --- | --- |
| SSBorAssociatedSSB2 | This field is mandatory present if ssb-ConfigMobility is configured or associatedSSB is configured in at least one cell or smtc3list is configured. Otherwise, it is absent, Need R. |
| SSBorAssociatedSSB1 | This field is mandatory present if ssb-ConfigMobility is configured or associatedSSB is configured in at least one cell. Otherwise, it is absent, Need R. |
| Not_IABMT | This field is mandatory present if smtc3 is not configured. Otherwise it is absent, Need R. |

In a case where the MT receives the MO, when smtc3 is configured in the MO, a referenceSignalConfig field may not exist and ssb-ConfigMobility or associatedSSB information that may be configured therein may also not be configured. Accordingly, the smtc1 information may not exist.

Upon receiving the MO, the MT may determine whether smtc1 or smtc3 exists.

When only smtc1 exists, the terminal may identify the Periodicity and Offset of smtc1 and perform measurement on all the cells of the corresponding frequency during the measurement window of Duration. Additionally, the terminal may apply the offset and duration of smtc1 to the cells of the pci list of smtc2 and may perform measurement in an smtc occasion to which the periodicity of smtc2 is applied.

When only smtc3 exists, the terminal may perform SSB measurement in an smtc3 occasion to which the periodicity, offset, duration, and ssbToMeasure information of smtc3 are applied, with respect to the cells of the pci list of smtc3. Also, multiple lists may be applied to smtc3. Each list may include pci list, periodicity, offset, duration, and ssbToMeasure information, and thus, the terminal may measure an ssb in multiple smtc3 occasions through the information included in each list.

Figure 12:
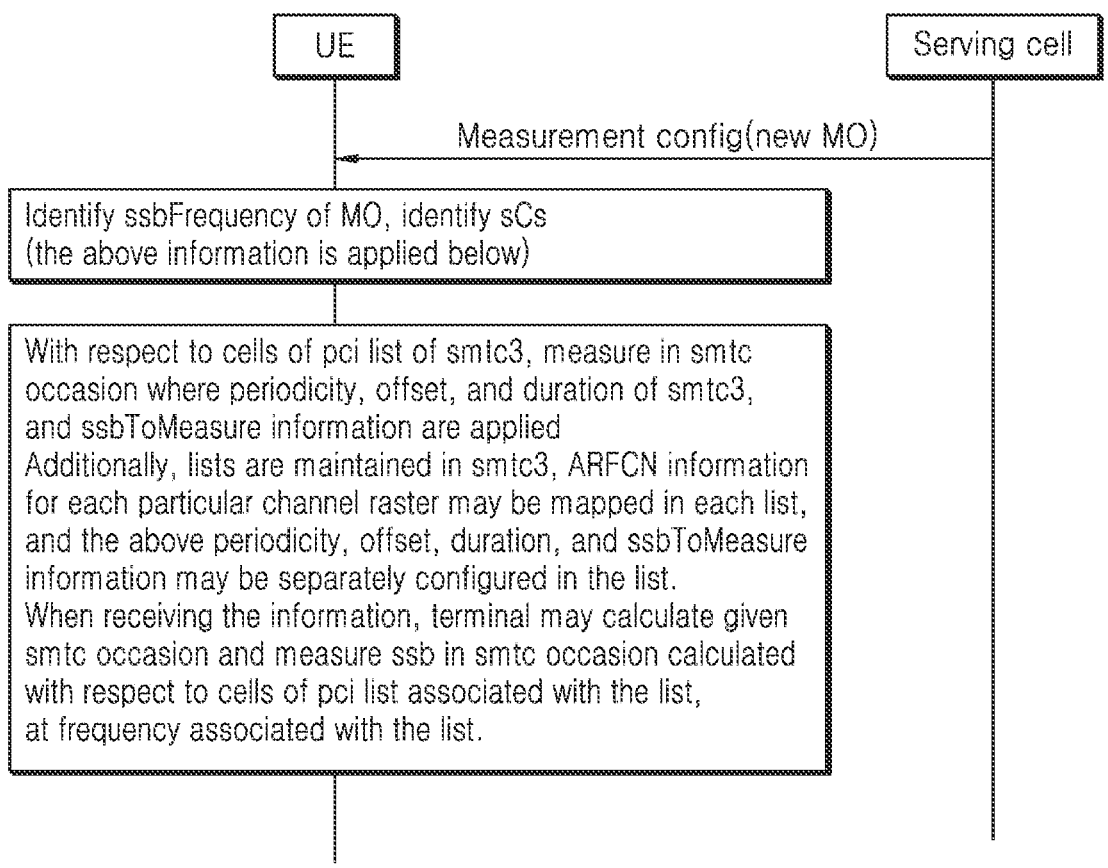
FIG. 12 is a diagram for describing a case where a measurement object configured for measurement by an MT is specialized for detecting a neighbor IAB node, according to an embodiment.

FIG. 12 is a diagram for describing a case where a measurement object configured for measurement by an MT is specialized for detecting a neighbor IAB node, according to an embodiment.

In the embodiment of FIG. 12, a new MO may be introduced. As in the following example, an indicator for configuring only smtc3 for an IAB node may be included in the MO itself, and a 1-bit indicator indicating a corresponding case may be included in the MO.

Necessary information: ssbFrequency, SCS, smtc3 list with each entry has smtc periodicity, offset, duration, pci list, ssb-toMeasure info. Or optionally indication for IAB MT purpose.

| MeasObjectNR_IABMT Information element |
| --- |
| -- ASN1START<br>-- TAG-MEASOBJECTNR-START<br>MeasObjectNR_IABMT ::=                        SEQUENCE {<br>   ssbFrequency                                        ARFCN-ValueNR<br>   ssbSubcarrierSpacing                         SubcarrierSpacing<br>   smtc3list-r16                                   SSB-MTC3List-<br>r16                                                      BOOLEAN -or ENUMERATED {yes}<br>      IAB_MT<br>}<br>SSB-MTC3List-r16: : =                     SEQUENCE (SIZE(1..4)) OF SSB-MTC3-r16<br>SSB-MTC3-r16 ::=                         SEQUENCE ( |

| MeasObjectNR_IABMT Information element | |
|---|---|
| ssb-MTC-Periodicity-r16 | ENUMERATED {ms5, ms10, ms20, ms40, ms80, ms160, ms320, ms640, ms1280}, |
| ssb-MTC-Timingoffset-r16 | INTEGER (0..127), |
| ssb-MTC-Duration-r16 | ENUMERATED (sf1, sf2, sf3, sf4, sf5}, |
| ssb-MTC-pci-List-r16 | SEQUENCE (SIZE (0. .63)) OF PhysCellId, |
| ssb-ToMeasure-r16 | SetupRelease { SSB-ToMeasure } OPTIONAL -- Need M |
| } | |

The MO type may be configured only for the IAB MT by the network.

The MT having received the MO may identify and apply ssbFrequency and SCS and may perform measurement in an smtc3 occasion to which the periodicity, offset, duration, and ssbToMeasure information of smtc3 are applied, with respect to the cells of the pci list of smtc3.

Additionally, lists may be maintained in smtc3, absolute radio frequency channel number (ARFCN) information for each particular channel raster may be mapped in each list, and the periodicity, offset, duration, and ssbToMeasure information may be separately configured in the list.

Upon receiving the information, the terminal may calculate a given smtc3 occasion and may measure an ssb in the calculated smtc3 occasion with respect to the cells of the pci list associated with the list at the frequency associated with the list.

Figure 13:
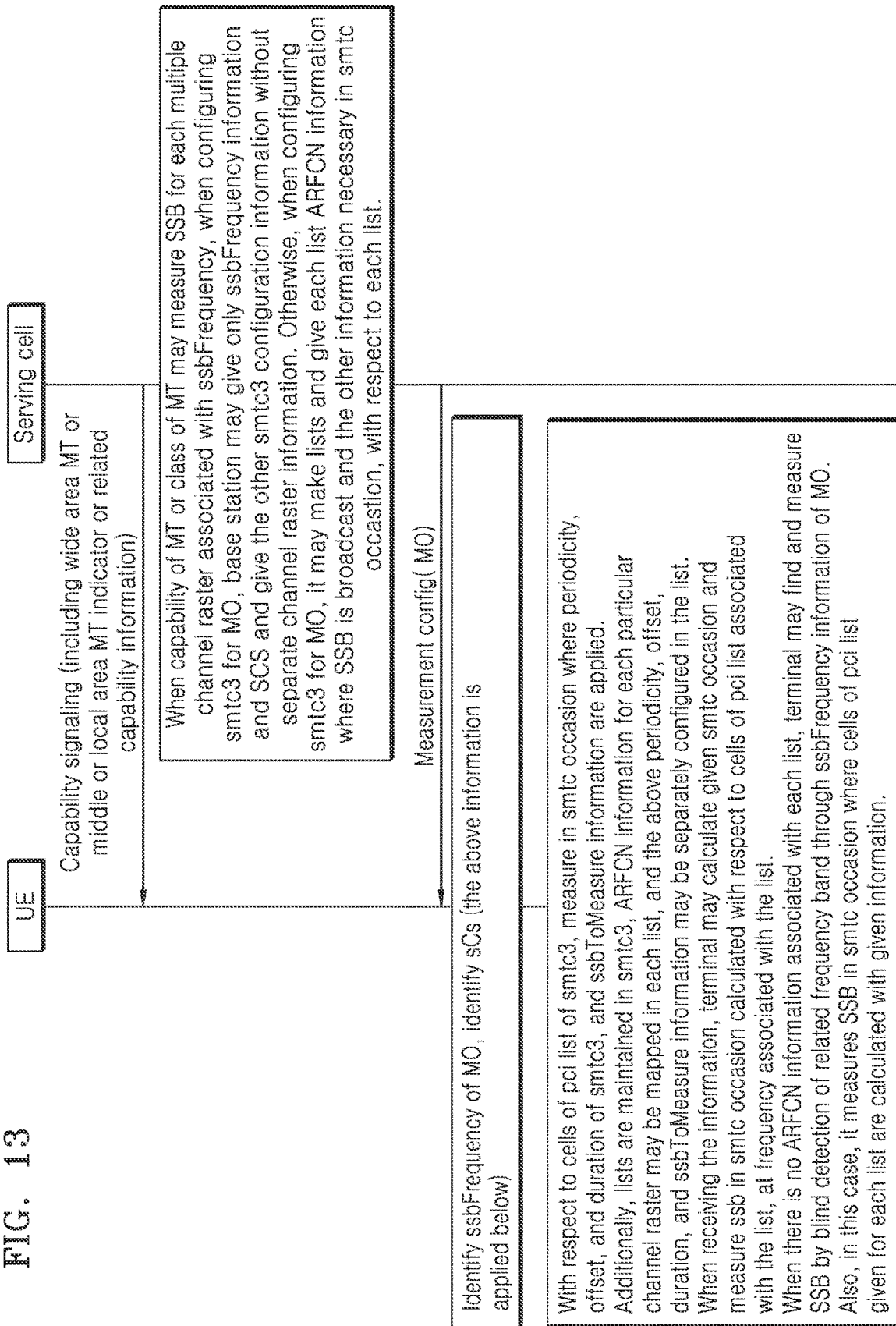
FIG. 13 is a diagram for describing a case where an MT adds multiple measurement frequency information in a measurement object according to capability or class, according to an embodiment.

FIG. 13 is a diagram for describing a case where an MT adds multiple measurement frequency information in a measurement object according to capability or class, according to an embodiment.

The MT may transmit information about whether its capability is wide area MT, medium area MT, or local area MT by indicating the same in a capability signaling message. A serving cell may receive the information through the capability signaling message, and when the capability of the MT or the class of the MT may perform SSB measurement for each of the multiple channel rasters associated with ssbFrequency without separate channel raster information, a base station may provide only ssbFrequency information and SCS and may provide the other smtc3 configuration information without separate channel raster information when configuring smtc3 for an MO. When the capability of the MT or the class of the MT may not perform SSB measurement for each of the multiple channel rasters associated with ssbFrequency without separate channel raster information, the base station may generate lists, may provide ARFCN information for broadcasting an SSB for each list, and may provide the other information necessary for an smtc occasion for each list when configuring smtc3 for the MO.

As an example, when the MT transmits wide area MT information, the serving base station may provide smtc3 configuration information without separate channel raster frequency information, and when the MT transmits local area MT information, the serving base station may provide smtc3 configuration information including separate frequency information for the MO.

When receiving the MO, the MT may perform measurement in an smtc occasion to which the periodicity, offset, duration, and ssbToMeasure information of smtc3 are applied, with respect to the cells of the pci list of smtc3.

Additionally, lists may be maintained in smtc3, ARFCN information for each particular channel raster may be mapped in each list, and the periodicity, offset, duration, ssbToMeasure, and pci list information may be separately configured for each entry in the list.

Upon receiving the information, the terminal may calculate an smtc3 occasion for each list entry and may measure an ssb in the calculated smtc3 occasion with respect to the cells of the pci list associated with the list entry at the frequency associated with the list entry.

When there is no ARFCN information associated with each list, the terminal may detect and measure an SSB by performing blind detection of all particular bands based on the ssbFrequency frequency of the MO. Also, in this case, the SSB may be measured in the smtc3 occasion calculated with the given information with respect to the cells of the pci list provided for each list.

The methods according to the embodiments of the present disclosure described in the specification or the claims may be implemented by hardware, software, or a combination thereof.

When the methods are implemented as software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the present disclosure described in the specification or the claims.

These programs (software modules or software) may be stored in random access memories (RAMs), nonvolatile memories including flash memories, read only memories (ROMs), electrically erasable programmable ROMs (EE-PROMs), magnetic disc storage devices, compact disc-ROMs (CD-ROMs), digital versatile discs (DVDs), other types of optical storage devices, or magnetic cassettes. Alternatively, the programs may be stored in a memory including any combination of some or all thereof. Also, each of the memories may be provided in plurality.

Also, the programs may be stored in an attachable storage device that may be accessed through a communication network such as Internet, Intranet, local area network (LAN), wide LAN (WLAN), or storage area network (SAN), or through a communication network configured as any combination thereof. Such a storage device may be connected through an external port to an apparatus performing an embodiment of the present disclosure. Also, a separate storage device on a communication network may be connected to an apparatus performing an embodiment of the present disclosure.

In the above particular embodiments of the present disclosure, the components included in the present disclosure are expressed in the singular or plural according to the presented particular embodiments. However, the singular or plural expressions are selected suitably according to the presented situations for convenience of description, the present disclosure is not limited to the singular or plural components, and the components expressed in the plural may even be configured in the singular or the components expressed in the singular may even be configured in the plural.

It should be understood that the embodiments of the present disclosure described herein should be considered in a descriptive sense only and not for purposes of limitation. That is, it will be understood by those of ordinary skill in the art that various changes in form and details may be made in the embodiments of the present disclosure without departing from the scope of the present disclosure. Also, the embodiments of the present disclosure may be operated in combination when necessary. For example, the base station and the terminal may be operated according to a combination of portions of an embodiment and another embodiment of the present disclosure. Also, other modifications based on the technical concept of the above embodiments may be implemented in various systems such as FDD LTE systems, TDD LTE systems, or 5G or NR systems.

The invention claimed is:

1. A method performed by an integrated access and backhaul-mobile termination (IAB-MT) in a wireless communication system, the method comprising:
   receiving configuration information for synchronization signal block (SSB) measurement including an SSB measurement time configuration 1 (SMTC1) to measure a normal neighbor cell and an SSB measurement time configuration 3 (SMTC3) list to measure an IAB node neighbor cell;
   obtaining the SMTC3 list from the received configuration information;
   identifying cells and SSB measurement timing based on parameters included in the obtained SMTC3 list; and
   performing measurement of an SSB corresponding to an ssbToMeasure parameter included in the obtained SMTC3 list, for the identified cells, based on the SSB measurement timing.

2. The method of claim 1, wherein the cells are identified based on a PCI list included in the obtained SMTC3 list.

3. The method of claim 1,
   wherein the SSB measurement timing is identified based on a period and offset parameter included in the obtained SMTC3 list, and
   wherein the measurement of the SSB is performed based on a duration parameter included in the obtained SMTC3 list.

4. The method of claim 1, wherein the SMTC3 list is transmitted together with SMTC1 through the configuration information for the SSB measurement.

5. A method performed by a base station in a wireless communication system, the method comprising:
   transmitting, to an integrated access and backhaul-mobile termination (IAB-MT), configuration information for synchronization signal block (SSB) measurement; and
   transmitting, to the IAB-MT, at least one SSB,
   wherein the configuration information for the SSB measurement includes an SSB measurement time configuration 1 (SMTC1) to measure a normal neighbor cell and an SSB measurement time configuration 3 (SMTC3) list to measure an IAB node neighbor cell,
   wherein cells and SSB measurement timing are identified based on parameters included in the SMTC3 list,
   wherein measurement of an SSB corresponding to an ssbToMeasure parameter included in the SMTC3 list is performed by the IAB-MT for the identified cells based on the SSB measurement timing.

6. The method of claim 5, wherein the cells are identified based on a physical cell identity (PCI) list included in the SMTC3 list.

7. The method of claim 5,
   wherein the SSB measurement timing is identified based on a period and offset parameter included in the SMTC3 list, and
   wherein the measurement of the SSB is performed based on a duration parameter included in the SMTC3 list.

8. An integrated access and backhaul-mobile termination (IAB-MT) in a wireless communication system, the IAB-MT comprising:
   a transceiver; and
   a processor configured to:
      receive configuration information for synchronization signal block (SSB) measurement through the transceiver including an SSB measurement time configuration 1 (SMTC1) to measure a normal neighbor cell and an SSB measurement time configuration 3 (SMTC3) list to measure an IAB node neighbor cell,
      obtain the SMTC3 list from the received configuration information,
      identify cells and SSB measurement timing based on parameters included in the obtained SMTC3 list, and
      perform measurement of an SSB corresponding to an ssbToMeasure parameter included in the obtained SMTC3 list, for the identified cells, based on the SSB measurement timing.

9. The IAB-MT of claim 8, wherein the cells are identified based on a physical cell identity (PCI) list included in the obtained SMTC3 list.

10. The IAB-MT of claim 8,
    wherein the SSB measurement timing is identified based on a period and offset parameter included in the obtained SMTC3 list, and
    wherein the measurement of the SSB is performed based on a duration parameter included in the obtained SMTC3 list.

11. The IAB-MT of claim 8, wherein the SMTC3 list is transmitted together with SMTC1 through the configuration information for the SSB measurement.

12. The IAB-MT of claim 8, wherein when the SMTC3 list is transmitted together with SMTC1 the SMTC3 list is prioritized.

13. A base station in a wireless communication system, the base station comprising:
    a transceiver; and
    a processor configured to:
       transmit, to an integrated access and backhaul-mobile termination (IAB-MT), configuration information for synchronization signal block (SSB) measurement through the transceiver, and
       transmit, to the IAB-MT, at least one SSB through the transceiver,
    wherein the configuration information for the SSB measurement includes an SSB measurement time configuration 1 (SMTC1) to measure a normal neighbor cell and an SSB measurement time configuration 3 (SMTC3) list to measure an IAB node neighbor cell,
    wherein cells and SSB measurement timing are identified based on parameters included in the SMTC3 list,
    wherein measurement of an SSB corresponding to an ssbToMeasure parameter included in the SMTC3 list is performed by the IAB-MT for the identified cells based on the SSB measurement timing.

14. The base station of claim 13, wherein the cells are identified based on a physical cell identity (PCI) list included in the SMTC3 list.

15. The base station of claim 13,
wherein the SSB measurement timing is identified based on a period and offset parameter included in the SMTC3 list, and
wherein the measurement of the SSB is performed based on a duration parameter included in the SMTC3 list.

16. The base station of claim 13, wherein the SMTC3 list is transmitted together with SMTC1 through the configuration information for the SSB measurement.

\* \* \* \* \*